June 18, 1968 N. E. WICKLIFF 3,389,345
ELECTRONIC FILTER WITH AUTOMATICALLY ADJUSTED BIAS
Filed Nov. 12, 1965
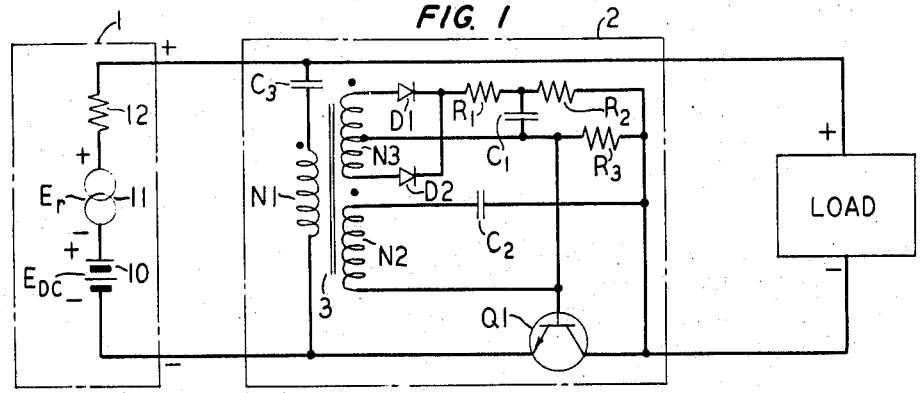
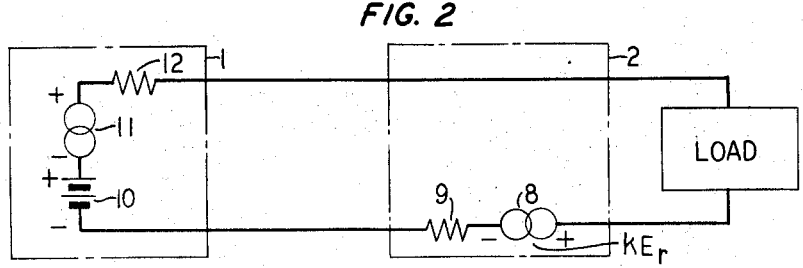
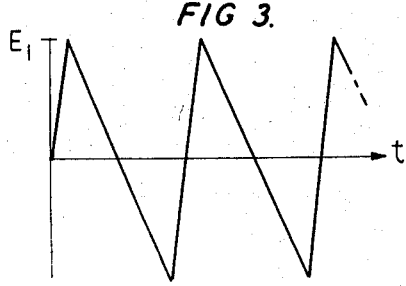
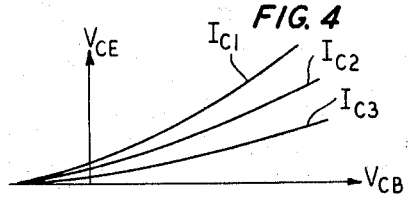
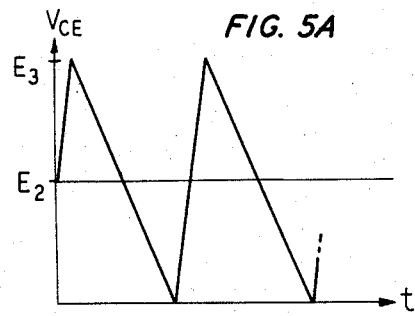
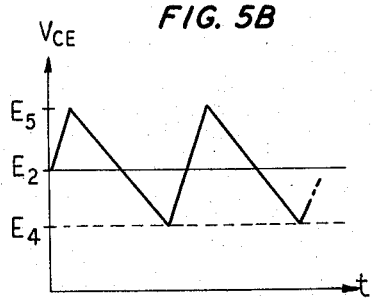
INVENTOR
N. E. WICKLIFF
BY R. B. Andis
ATTORNEY

United States Patent Office 3,389,345
Patented June 18, 1968

3,389,345
ELECTRONIC FILTER WITH AUTOMATICALLY ADJUSTED BIAS
Noble E. Wickliff, Winston-Salem, N.C., assignor to Bell Telephone Laboratories, Incorporated, New York, N.Y., a corporation of New York
Filed Nov. 12, 1965, Ser. No. 507,446
5 Claims. (Cl. 330—40)

ABSTRACT OF THE DISCLOSURE

An electronic filter wherein a common collector amplifier has its input terminals transformer coupled to the ripple component of a rectified D.C. source and its output terminals serially connected with the source and the load to cancel the ripple component. An automatic bias adjusting network is connected to adjust the transistor bias in response to ripple magnitude variations and thereby increase the efficiency of filtering.

---

This invention relates generally to electrical filtering in power supplies and more particularly to means for electronically filtering ripple from a direct-current power supply.

Frequently electrical power is obtained by rectifying an alternating-current power source to produce a unidirectional pulsating current consisting of a D.C. component and an alternating-current component designated as "ripple." This ripple component may be composed of a large number of sinusoidal currents of varying magnitudes at frequencies which are harmonics of the A.C. power source frequency. Other commonly existing D.C. power supplies such as D.C. generators or batteries also contain A.C. components in the form of spurious disturbances which may similarly be designated as ripple components. In order to provide a smoothed D.C. power supply the above-mentioned D.C. sources are generally filtered to eliminate the ripple component. This invention is concerned with filtering any source having a D.C. component and a component composed of A.C. signal elements—hereinafter to be designated as "ripple."

Conventional filters consist at least of a pair of impedances connected in series across the direct-current power source with the load impedance connected across one of the two. The series impedances are designed so that at the lowest frequency included in the ripple voltage, the impedance of the parallelled one is considerably lower than the remaining impedance. The impedance connected in parallel with the load is usually a capacitor which must be of large value in order to produce the small impedance required to reduce the ripple to within a specified tolerance level. Practical limitations such as the physical size of capacitor required and the cost thereof often determine the quality of filtering that may be obtained. Furthermore, weight and size reduction problems which become acute in applications such as power supplies for space vehicle systems serve to emphasize the need for new and better filtering techniques.

Accordingly, it is an object of this invention to provide a compact and light ripple filter.

Another object of this invention is to provide a compact electronic filter with a substantially increased ripple reduction capability.

Still another object of this invention is to provide in an electronic filter efficient filtering in the face of varying magnitudes of ripple voltages.

In a preferred embodiment of the invention, a transistor amplifier in a common collector configuration is connected with its input electrodes transformer-coupled to the ripple component of a rectified source and with its output terminals series-connected between the load and the D.C. source. The transformer turns ratio and amplifier gain are designed so that the voltage at the amplified output terminals is equal in magnitude to, but opposite in phase with, the source ripple component in order to provide complete cancellation thereof. Additionally, there is provided means for automatically adjusting the bias voltage applied to the amplifier to compensate for varying ripple voltage magnitudes in order to efficiently accommodate such changes and provide a minimum of wasted power dissipated in the transistor. This automatic bias adjustment feature is provided by means of an additional transformer winding coupled to a simple rectifier filter arrangement to produce a D.C. voltage magnitude proportional to the magnitude of ripple voltage.

These and other features of the invention will be apparent from the following detailed specification and accompanying drawing in which:

FIG. 1 is a drawing of an active filter circuit in accordance with the invention;

FIG. 2 is a schematic circuit showing equivalent circuits of the active filter and power source;

FIG. 3 is a graphical illustration of a typical ripple waveform;

FIG. 4 is a family of curves showing characteristics of a typical junction transistor; and FIGS. 5A and 5B are graphical illustrations showing the advantages derived from an automatic bias adjustment.

A preferred active filter circuit embodiment is shown in FIG. 1 connected to the equivalent circuit of a rectified power source 1. The rectified power source 1 is represented by a D.C. source 10 in series with a ripple component source 11 and an output impedance 12. The voltage magnitudes of sources 10 and 11 are designated by $E_{DC}$ and $E_r$, respectively. The filter circuit 2 consists of an NPN junction transistor Q1 arranged in a common collector configuration with the emitter and collector as output electrodes connected respectively between the negative terminal of the source and the negative terminal of the load. A three-winding transformer 3 couples the transistor input electrodes to the power source 1. A first winding N1 is connected to the rectifier power supply through capacitor $C_3$ to prevent D.C. current from saturating the transformer core. A second winding N2 couples the ripple component voltage of source 11 to the base and collector electrodes or input of transistor Q1. The saturation of winding N2 by D.C. currents is prevented by blocking capacitor $C_2$. A third winding N3 on transformer 3 is also coupled by means of winding N1 to the ripple component source 11. The output from winding N3 is rectified by means of diodes D1 and D2 to provide a full wave rectified voltage which is filtered by the low-pass filter composed of elements $R_1$ and $C_1$. A portion of this rectified voltage is applied to the base collector input electrodes by means of the voltage divider $R_2$ and $R_3$. Thus any change in ripple voltage amplitude appears as a corresponding change in D.C. voltage across capacitor $C_1$ and as a corresponding proportional bias voltage change at the input electrodes by virtue of the voltage divider described. Windings N1 and N2 of transformer 3 are wound with a turns ratio approximating unity and, as shown by the dots according to standard practice, impress a voltage from collector to base which is the same polarity and magnitude as ripple source 11 as defined. Since a common collector configuration has a voltage gain which approximates unity, this produces a voltage at the output emitter-collector terminals having a magnitude approximating $E_r$, the voltage of source 11, and a polarity such that the emitter is negative with respect to the collector. To insure that the ripple voltage magnitude at the transistor output terminals is equal to the ripple voltage magnitude of source 11, the unity transformation ratio between windings N1 and N2 may be increased slightly to compensate for any deviation from unity gain in the transistor amplifier. Furthermore, any disrupting phase shift suffered by the signal $E_r$ in its transmission through transformer 3 to the output of transformer Q1 can be compensated for by means of phase shifting networks appropriately inserted in the transmission path.

FIG. 2 shows the simplified equivalent circuit of filter 2 connected between the load and the equivalent circuit of rectified power source 1. The equivalent circuit for the filter is shown as a dependent source 8 having a magnitude of $kE_r$ with a polarity as shown and an output impedance 9. Assuming that all necessary phase shifting networks have been included in the ripple transmission path (including transformer 3 and transistor Q1) and that the transformation ratios between windings N1 and N2 have been adjusted as described, the constant $k$ will be unity and the voltage of ripple source 11 will be exactly equal and opposite to the voltage of source 8. Summing the voltage around the loop, it is seen that the voltage across the load is exactly equal to the D.C. voltage of source 10 less any drop caused by D.C. load current flowing through resistors 9 and 12. The ripple components 11 from the rectified power source is completely cancelled by the dependent source 8. Furthermore, the regulation is not made to suffer appreciably since the amplifier output impedance 9 is relatively small by virtue of the common collector configuration employed.

It may be noted that in addition to providing a near unity voltage gain and a low output impedance, the common collector configuration provides the advantages of a high input impedance to minimize transformer loading and stability of gain and output impedance in the face of varying bias voltages. This stability is utilized to advantage in connection with the bias adjustment feature described below.

Referring again to FIG. 1, a third winding N3 on transformer 3 is also coupled via winding N1 to the power supply ripple component voltage source 11. For the purposes of illustration, it will be assumed that source 11 has a sawtooth waveshape so that the voltage across winding N3 appears as shown in FIG. 3, transformed to have a peak magnitude of $E_1$. This voltage is rectified by means of diodes D1 and D2 and appears between the junction of the two diodes and the centertap of winding N3 as a full wave rectified voltage. The full wave rectified voltage is then passed through a low-pass filter consisting of a resistor R1 and a capacitor C1 connected between the junction of the rectifier diodes D1 and D2 and the centertap. The resulting D.C. voltage across capacitor C1 has a magnitude approximating ½ $E_1$. This D.C. voltage is now fed via the voltage divider formed by resistors $R_2$ and $R_3$ to the base-collector electrodes of transistor Q1 where it appears as a D.C. voltage with a magnitude equal to $$\frac{1}{2} \frac{R_3}{R_3+R_2} E_1$$

Therefore, the collector-to-base D.C. bias voltage is made to be proportional to $E_1$ and consequently proportional to the source ripple component $E_r$.

A typical family of characteristic curves for a junction transistor is shown in FIG. 4 wherein collector-to-base voltage is plotted versus collector-to-emitter voltage for a constant collector current. Analysis of these curves discloses that for a constant collector current ($I_C$), the collector-to-base voltage is proportional to the collector-to-emitter voltage. Illustratively, as the D.C. value of the collector-to-base voltage increases with increasing voltage magnitudes of ripple source 11, a resulting increase occurs in the collector-to-emitter voltage.

The effect of the described dependence of voltage between the collector-emitter junction and the power supply ripple component magnitude is to produce a more efficient filtering arrangement. The increased efficiency results from the utilization of the automatic bias adjustment feature to produce class A operation of transistor Q1 with the voltage across the collector-to-emitter junction adjusted so that its quiescent value is one half the peak-to-peak value of the amplified ripple component as shown in FIG. 5A. This reduces the power dissipated in the filter and thereby cuts wasted power to a minimum. As shown in FIG. 5A, the D.C. or quiescent voltage across collector-to-emitter terminals designated as $E_2$ is midway between zero and the peak value of the voltage waveform so that the ripple component peak-to-peak value designated as $E_3$ is twice the value of the D.C. component represented by $E_2$.

FIG. 5B illustrates a situation of inefficient operation in a filter lacking the automatic bias adjustment circuitry for maintaining the prescribed ratio between the collector-to-emitter D.C. component $E_2$ and the ripple component $E_3$. Since the magnitude of the rectified source ripple component is subject to random variation, this illustration will show why inefficiency results when the bias is not automatically adjusted. Illustratively, if the ripple source 11 diminished in magnitude to one half of its previous value and no bias adjustment feature was provided, the resulting waveform shown in FIG. 5B would appear across collector-emitter terminals of transistor Q1. An examination of FIG. 5B shows that the D.C. level $E_2$ remains constant (since without an adjustment in bias there is no corresponding change in quiescent collector-to-emitter voltage) while the ripple component magnitude represented by the difference between voltages $E_5$ and $E_4$ is now one half the previous value of $E_3$. It is immediately evident that the filter is wasting the power represented by the product of voltage $E_4$ and collector current flowing through transistor Q1. If the automatic bias adjustment feature was included, the D.C. level in FIG. 5B would be adjusted downward in the face of diminished ripple magnitude so that voltage $E_4$ (corresponding to the minimum value of the ripple voltage across collector-to-emitter) would be zero.

It is to be understood that the above-described arrangements are illustrative of the application of the principles of the invention. Numerous other arrangements may be devised by those skilled in the art without departing from the spirit and scope of the invention.

What is claimed is:

1. A filter circuit connected between a load and a voltage source having a D.C. component and a ripple component comprising an amplifier having a pair of input terminals and a pair of output terminals, a transformer having its primary winding connected across said voltage source and its secondary winding connected to the input terminals of said amplifier to supply at least a portion of said ripple component to the input terminals of said amplifier, said amplifier having a substantially unity gain to produce at its output terminals a voltage having the same magnitude as said ripple component but opposite in phase to said ripple component, and means serially connecting said voltage source, said load, and the output terminals of said amplifier whereby the ripple component of said source is cancelled by the opposite phase voltage at the output terminals of said amplifier.

2. A filter circuit in accordance with claim 1 wherein a first capacitor is serially connected with said voltage source and said primary winding and a second capacitor is serially connected with said secondary winding and the input terminals of said amplifier to prevent D.C. currents from saturating said transformer.

3. A filter circuit in accordance with claim 1 including automatic bias adjusting means coupled to said primary winding and the input terminals of said amplifier to automatically adjust the voltage at the output terminals of said amplifier so as to produce a voltage at said output terminals which has an average value substantially equal to one-half the peak-to-peak value of the ripple component.

4. A filter circuit in accordance with claim 3 wherein said automatic bias adjusting means comprise a third winding on said transformer, a full-wave rectifier connected to said third winding, and a low-pass filter interconnecting said rectifier with said amplifier input terminals.

5. A filter circuit in accordance with claim 3 wherein said amplifier comprises a transistor having base, collector, and emitter electrodes, the base electrode of said transistor being connected to one terminal of said secondary winding and a center tap terminal of said third winding, the collector electrode of said transistor being connected to said load, and the emitter electrode of said transistor being connected to said source.

References Cited
UNITED STATES PATENTS

| | | | |
|---|---|---|---|
| 2,897,430 | 7/1959 | Te Winkel | 323—22 |
| 2,995,697 | 8/1961 | Grenier | 323—22 |

ROY LAKE, *Primary Examiner.*

L. J. DAHL, *Assistant Examiner.*